US010999188B1

(12) United States Patent
Cafarelli et al.

(10) Patent No.: US 10,999,188 B1
(45) Date of Patent: May 4, 2021

(54) TOOL PORT ALIASING IN A NETWORK VISIBILITY FABRIC

(71) Applicant: Gigamon Inc., Santa Clara, CA (US)

(72) Inventors: Dominick Cafarelli, Ossining, NY (US); Murali Bommana, Fremont, CA (US); Tushar Jagtap, Fremont, CA (US)

(73) Assignee: Gigamon Inc., Santa Clara, CA (US)

( * ) Notice: Subject to any disclaimer, the term of this patent is extended or adjusted under 35 U.S.C. 154(b) by 9 days.

(21) Appl. No.: 16/749,906

(22) Filed: Jan. 22, 2020

(51) Int. Cl.
H04L 12/725 (2013.01)
H04L 12/26 (2006.01)
H04L 12/813 (2013.01)
H04L 12/859 (2013.01)
H04L 12/751 (2013.01)
H04L 12/851 (2013.01)
H04L 29/06 (2006.01)

(52) U.S. Cl.
CPC .......... H04L 45/306 (2013.01); H04L 43/028 (2013.01); H04L 43/04 (2013.01); H04L 43/062 (2013.01); H04L 43/12 (2013.01); H04L 45/02 (2013.01); H04L 47/20 (2013.01); H04L 47/2475 (2013.01); H04L 47/2483 (2013.01); H04L 63/0263 (2013.01); H04L 63/1425 (2013.01)

(58) Field of Classification Search
None
See application file for complete search history.

(56) References Cited

U.S. PATENT DOCUMENTS

| | | | | |
|---|---|---|---|---|
| 6,771,662 B1* | 8/2004 | Miki | ................... | H04L 49/3009 370/395.52 |
| 6,944,155 B2* | 9/2005 | Block | ................... | H04L 49/351 370/389 |
| 8,370,512 B2* | 2/2013 | Kobayashi | ............ | H04L 49/351 709/230 |
| 2009/0010254 A1* | 1/2009 | Shimada | ............... | H04L 45/245 370/389 |
| 2011/0269514 A1* | 11/2011 | Ge | .................... | H04W 52/0216 455/574 |
| 2014/0108632 A1* | 4/2014 | Narasimha | .............. | H04L 45/38 709/223 |
| 2019/0140957 A1* | 5/2019 | Johansson | ............. | H04L 47/741 |

* cited by examiner

Primary Examiner — Eunsook Choi
(74) Attorney, Agent, or Firm — Perkins Coie LLP

(57) ABSTRACT

A method of operating a network visibility node is disclosed. In certain embodiments, the network visibility node has a plurality of network ports through which to communicate data with a plurality of network hosts and has a plurality of tool ports through which to communicate data with a plurality of network tools. The network visibility node accesses a port group map associated with a plurality of tool port groups of the network visibility node, where each of the tool port groups includes one or more tool ports of the network visibility node, and where the port group map contains a separate tool alias for each tool port group of the plurality of tool port groups. Each tool alias can correspond to a different type of network traffic. The network visibility node uses the port group map to ascertain a tool port group through which to communicate the plurality of packets with a particular network tool.

18 Claims, 11 Drawing Sheets

| Traffic Type | Port Group |
|---|---|
| Video | PG1 |
| IMS_Voice | PG2 |
| Internet | PG3 |

FIGURE 4A

| Port Group | Tool Ports |
|---|---|
| PG1 | 1, 2, 3, 4 |
| PG2 | 5, 6 |
| PG3 | 7, 8 |

FIGURE 4B

CPN — 400a

| Traffic Type | Port Group |
| --- | --- |
| Video | PG1 |
| IMS_Voice | PG2 |
| Internet | PG3 |

410a

| Port Group | Tool Ports |
| --- | --- |
| PG1 | 1, 2, 3, 4 |
| PG2 | 5, 6 |
| PG3 | 7, 8 |

UPN — 400b

| Traffic Type | Port Group |
| --- | --- |
| Video | PG3 |
| IMS_Voice | PG1 |
| Internet | PG2 |

410b

| Port Group | Tool Ports |
| --- | --- |
| PG1 | 1, 2 |
| PG2 | 3, 4 |
| PG3 | 5, 6 |

FIGURE 4C

| Tool Alias | Port Group | Tool Ports |
|---|---|---|
| video | PG1 | 1, 2, 3, 4 |
| ims_voice | PG2 | 5, 6 |
| internet | PG3 | 7, 8 |

TOOL PORT ALIASING IN A NETWORK VISIBILITY FABRIC

TECHNICAL FIELD

At least one embodiment of the present disclosure pertains to techniques for providing visibility into network traffic, and more particularly, for a technique of providing tool port indirection in a network visibility architecture.

BACKGROUND

Network communications traffic may be acquired at numerous entry points on a network by one or more devices called network "visibility nodes" to provide extensive visibility of communications traffic flow and network security. These network visibility nodes, which may include physical devices, virtual devices, and Software Defined Networking (SDN)/Network Function Virtualization (NFV) environments, may be collectively referred to as the computer network's "visibility fabric." Various kinds of network tools are commonly coupled to such visibility nodes and used to identify, analyze, and/or handle security threats to the computer network, bottlenecks in the computer network, etc. Examples of such tools include an intrusion detection system (IDS), an intrusion prevention system (IPS), a network monitoring system, and an application monitoring system. The network visibility nodes are typically used to route network traffic (e.g., packets) to and from one or more connected network tools for these purposes. Examples of network visibility nodes suitable for these purposes include any of the GigaVUE® series of visibility appliances available from Gigamon® Inc. of Santa Clara, Calif.

Network visibility fabrics can be used with many different kinds of computer networks. One type of network is a core network of a wireless telecommunications carrier. In the context of wireless telecommunications, Evolved Packet Core (EPC) is a framework for providing voice and data on a single core network architecture. Historically, wireless core network architectures processed traffic through two separate subdomains: circuit-switched for voice and packet-switched for data. However, EPC unifies voice and data on an Internet Protocol (IP) architecture, so that operators (also referred to as "wireless service providers," "cellular companies," or "carriers") can support various access networks with a single data network. Examples of access networks include 2G, 3G, WLAN, WiMAX, and Long-Term Evolution (LTE), LTE-Advanced (LTE-A) and 5G.

FIG. 1 includes a high-level illustration of a network architecture showing how a user equipment (UE) device can be connected to an EPC via an access network. As shown in FIG. 1, the principal components of the EPC are (1) a mobility management entity (MME) that authenticates UE devices as those UE devices establish a session; (2) a serving gateway (S-GW) that forwards packets through the access network; and (3) a packet data network gateway (P-GW) that acts as an interface between the access network and the data network (also referred to as the "core network").

EPC was designed to have a "flat" architecture so that traffic can be efficiently handled from the performance and cost perspectives. Historically, the MME has dealt with traffic associated with the control plane, while the S-GW and P-GW have dealt with traffic associated with the user and control planes. Because of this functional split, operators have been able to adapt/scale the EPC as necessary.

As mobility increasingly becomes a part of life, resource demands are changing rapidly. Generally, the resources consumed by the control plane are related to signaling (e.g., due to the initiation of sessions by new UE devices), while the resources consumed by the user plane are related to the consumption of data. In the past, demands for resources for the control and user planes were relatively predictable. However, increased variations in resource demands are being observed across these planes. EPC was introduced to address this challenge with a degree of separation between the control plane and the user plane. But as the makeup of the access networks continue to evolve, the need for further separation of these planes has become apparent.

Control and User Plane Separation (CUPS) is a technique associated with the LTE and 5G standards, to provide the ability to scale the control plane and the user plane independently of one another on an as-needed basis in real time. As such, CUPS is a more cost-effective approach to improving the underlying network architecture over time. CUPS allows operators to specialize the user plane for different applications without incurring the cost of a dedicated control plane for each application. Moreover, CUPS enables operators to optimize data center costs by hosting the control plane and the user plane in different geographical locations, as well as save on backhaul costs by terminating data at the edge of the data network.

A network visibility fabric such as described above can be used to improve visibility into communications traffic on an EPC. However, while CUPS implemented on an EPC provides certain benefits as noted above, it also can complicate implementations of the network visibility fabric.

BRIEF DESCRIPTION OF THE DRAWINGS

Various features of the technology will become apparent to those skilled in the art from a study of the Detailed Description in conjunction with the drawings. Embodiments of the technology are illustrated by way of example and not limitation in the drawings, in which like references may indicate similar elements.

FIG. 4A illustrates an example of a flow map that can be implemented in a control processing node (CPN) or a user processing node (UPN) in a CUPS architecture.

FIG. 4B illustrates a first example of a port map that can be implemented in a control processing node or a user processing node in a CUPS architecture.

FIG. 4C illustrates examples of flow maps and port maps that may be used by a CPN and a UPN in accordance with one embodiment.

FIG. 5A illustrates a second example of a port map that can be implemented in a control processing node or a user processing node to provide more efficient operation in a CUPS environment.

DETAILED DESCRIPTION

Figure 1:
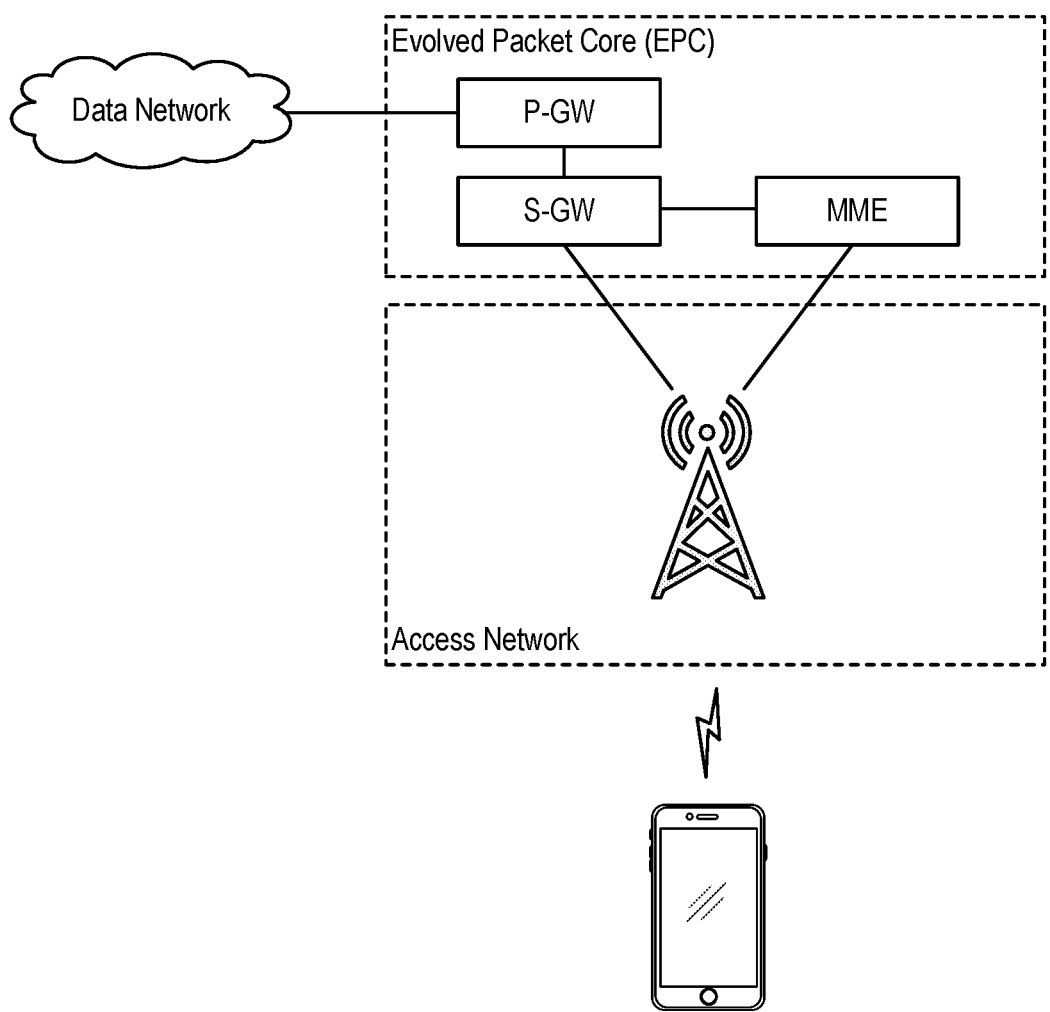
FIG. 1 includes a high-level illustration of a network architecture showing how a UE device can be connected to an Evolved Packet Core (EPC) via an access network.

With the introduction of CUPS there is a need to deploy separate control nodes and user nodes in an EPC network, typically at different locations in the network. Correspondingly, a network visibility fabric configured for use in an EPC that implements CUPS (an "EPC/CUPS architecture") generally includes separate network visibility nodes for the EPC's control and user nodes; those visibility nodes are referred to as the control processing node (CPN) and user processing node (UPN), respectively. A network visibility platform can include at least one CPN that processes traffic handled by gateways in the control plane (referred to as "control gateways") and at least one UPN that processes traffic handled by gateways in the user plane (referred to as "user gateways").

The network visibility nodes (CPN and UPN(s)) and associated tools should receive the correct control and user traffic according to a given set of policies. For example, internet protocol (IP) multimedia system (IMS) traffic at the control node (SGW-C, PGW-C) may need to be handled by a certain type of tool connected to the CPN, and all corresponding user traffic from the user-nodes (SGW-U, PGW-U) for those sessions should be sent to the corresponding local tool at the UPN without any errors. On the other hand, control packets for video may need to be sent to a different tool at the CPN than the IMS traffic, and the corresponding user packets should also be sent to a separate corresponding tool at the user node. This is generally handled by configuring various policy maps in the CPN and the UPN, which may include in each of these nodes a flow map that is used to associate each type of network traffic with a particular port group, and a port map that is used to define the tool ports that are included in each port group.

With today's configurations, the service provider (wireless carrier) has to configure these maps correctly on the CPN and UPN, so that each type of traffic is sent to the correct tool(s). This generally requires mirroring all of the maps from the CPN to the UPN(s), and then modifying at least the port map on the UPN to reflect its local tool configuration. This process is subject to human error, which can cause data loss at the tools.

Introduced here, therefore, is a technique that avoids the need to mirror these maps from the CPN to the UPN(s), as described further below. The technique involves creating a new property, called "tool alias" herein, which is included in the port map of the CPN and each UPN in the visibility fabric. The tool alias property is used to associate each of various types of network traffic with a particular tool port group in a visibility node (e.g., a CPN or UPN). The CPN does correlation of data and applies the configured policies. When the CPN sends the flow forwarding information to the UPN(s), it includes the tool alias for the applicable traffic type. Hence, there is no longer a need to mirror the flow map from the CPN to the UPN. All that is needed in the UPN is a local port map that includes the tool alias for each port group. When the UPN receives the tool alias from the CPN, it simply looks up that tool alias in the port map to determine its appropriate tool ports to which to send the traffic. Hence, with this approach the UPN only needs to know the mapping of tool alias to its local port group; all of the forwarding policy decisions are made by the CPN.

Figure 2:
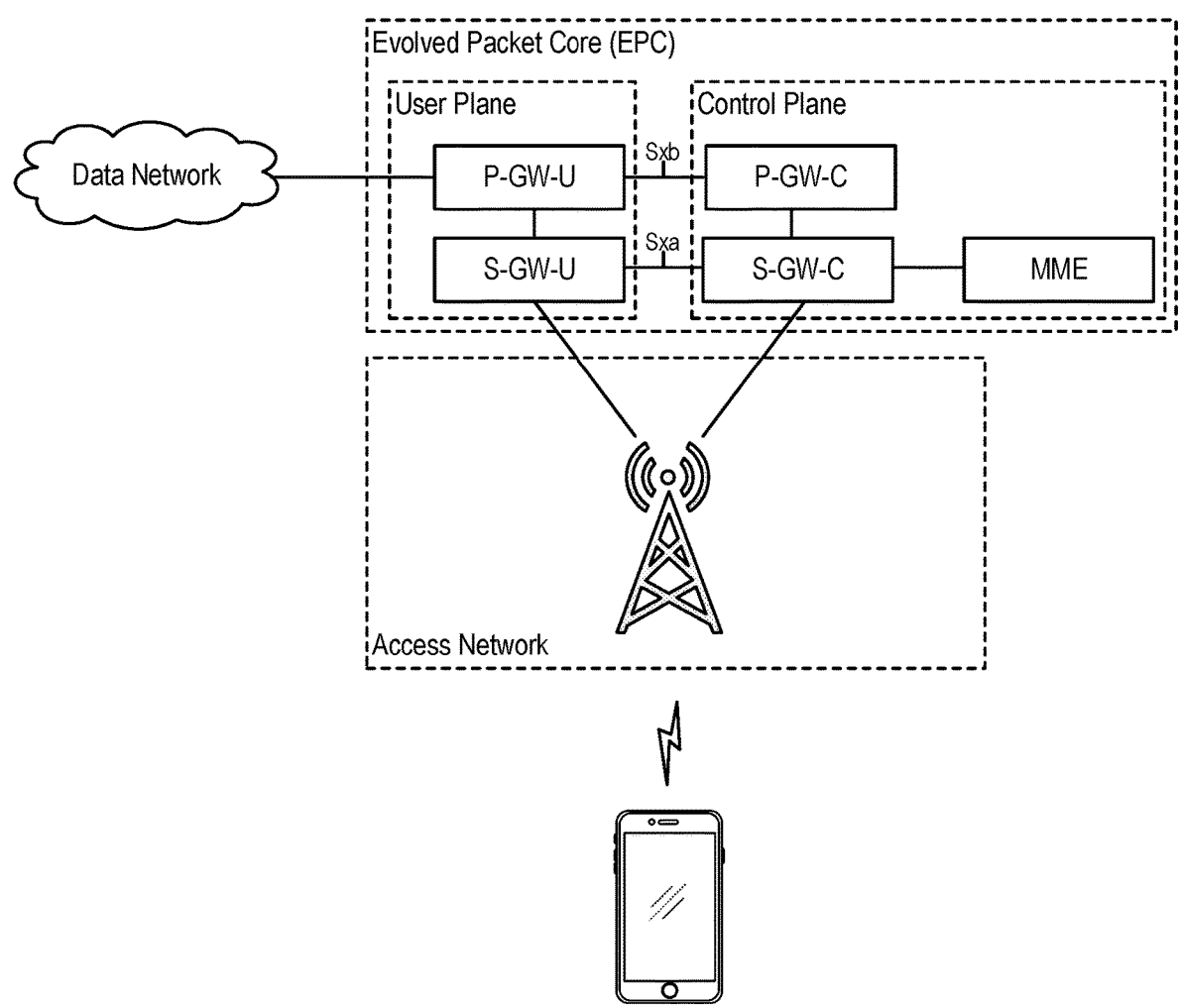
FIG. 2 includes a high-level illustration of a network architecture showing how a UE device can be connected to an EPC with Control and User Plane Separation (CUPS) via an access network.

FIG. 2 includes a high-level illustration of a network architecture showing how a UE device can be connected to an EPC/CUPS via an access network. When CUPS is implemented, the serving gateway (S-GW) and the packet data network gateway (P-GW) are logically separated into a pair of gateways (S-GW-U and P-GW-U) in the user plane and a pair of gateways (S-GW-C and P-GW-C) in the control plane. In the illustrated example, the user plane includes a single pair of gateways and the control plane includes a single pair of gateways. However, as the demand for data by UE devices on the access network increases, the network operator may opt to increase the number of gateways in the user plane.

CUPS introduces an interface (also referred to as the "Sx/N4 interface") between the control and user planes. As shown in FIG. 2, the Sx/N4 interface can include one or more sub-interfaces. Here, for example, a first sub-interface (Sxa) extends between the packet data network gateway in the control plane and the packet data network gateway in the user plane, while a second sub-interface (Sxb) extends between the serving gateway in the control plane and the serving gateway in the user plane.

Often it is desirable to analyze the traffic in the control and user planes to improve decision making with respect to network operations, security techniques, etc. Consequently, visibility platforms can separately tap the traffic handled by the gateways of an EPC with CUPS, regardless of where those gateways are located. A visibility platform can include at least one CPN and at least one UPN. Each CPN may be associated with a pair of gateways (i.e., P-GW-C and S-GW-C) in the control plane, and each UPN may be associated with a pair of gateways (i.e., P-GW-U and S-GW-U) in the user plane. The number of UPNs may be based on the demand for data by the UE devices on the access network managed by the EPC with CUPS. When the demand for data increases, the operator may choose to expand the EPC by adding pairs of gateways in the user plane. Accordingly, some embodiments (not illustrated) of a visibility platform may include a single CPN and multiple UPNs, while other embodiments may include multiple CPNs and multiple UPNs.

Collectively, the CPNs and UPNs may be referred to as the "nodes" or "visibility nodes" of the visibility platform. Each of these nodes may be implemented as pure hardware, or as a combination of hardware and software. Furthermore, one or more CPNs can be implemented in the same physical housing as one or more UPNs; or at least some of these nodes may be implemented in their own physical housings, which may be deployed at different physical locations on the network. Note that while embodiments are described herein in the context of an EPC with CUPS, the technology introduced here may be similarly applicable to other types of networks, such as 5G Next Generation Mobile Core Networks (5GCs).

Visibility Platform Architecture for CUPS

Figure 3A:
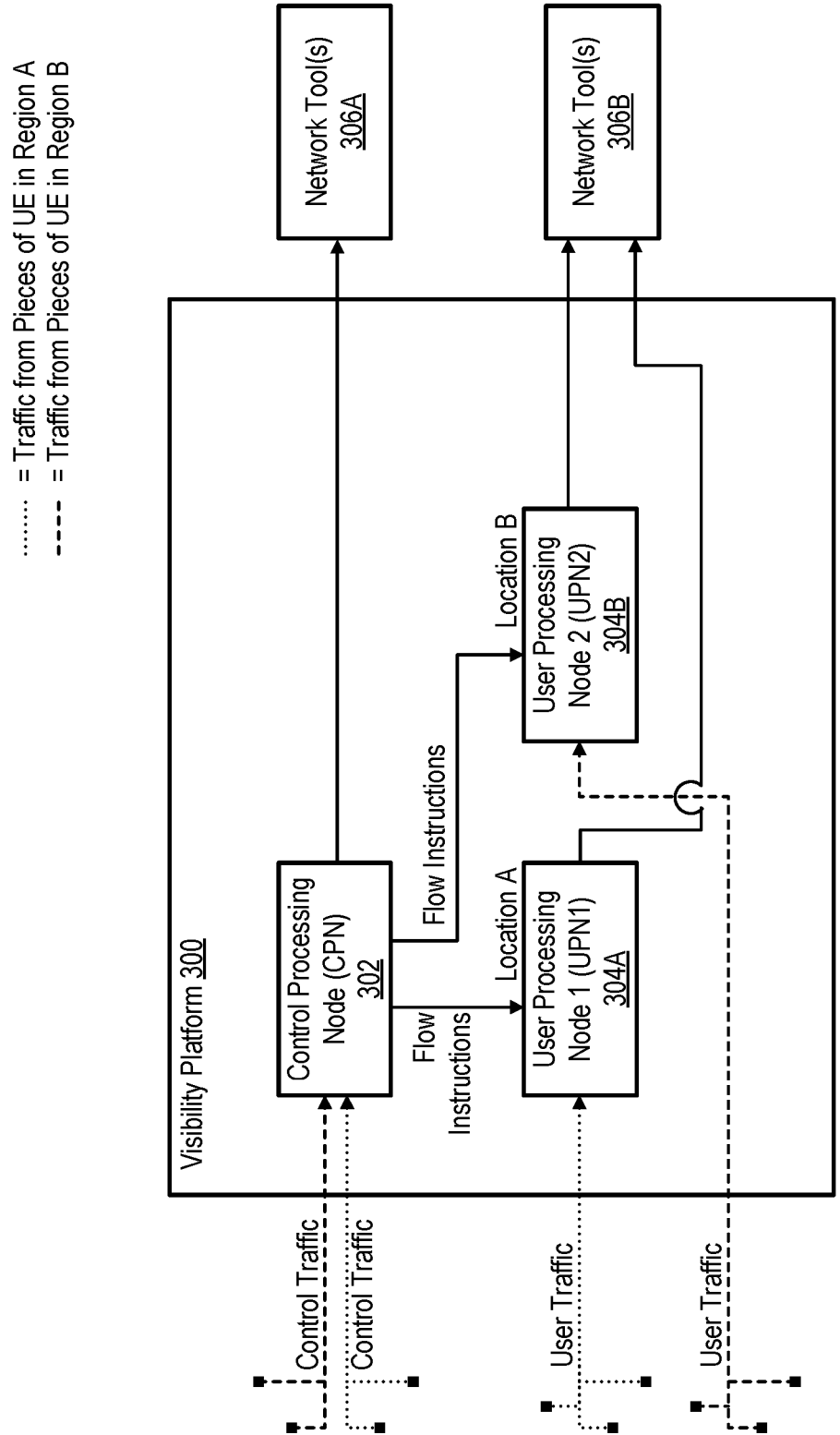
FIG. 3A depicts an example of a visibility platform that processes the traffic of an EPC with CUPS.

FIG. 3 depicts an example of a visibility platform 300 that processes the traffic of an EPC/CUPS. The illustrated arrangement enables the traffic handled by the control and user planes to be tapped separately for visibility purposes. For example, the control traffic associated with UE devices located in two geographical regions (Region A and Region B) is routed to CPN 302. Meanwhile, the user traffic (also referred to as "data traffic") associated with the UE devices located in Region A is routed to a UPN, UPN1 304A, and the user traffic associated with UE devices located in Region B is routed to a second UPN, UPN2 304B. Generally, UPN1 304A and UPN2 304B are located near Regions A and B, respectively, to reduce the latency experienced by the UE devices. CPN 302 may be located in Region A, Region B, or another location altogether (e.g., Region C). With such an arrangement, the user traffic originating from a given UE device could be handled by UPN1 304A and UPN2 304B at different points in time (e.g., as the user travels from Region A to Region B), though the control traffic originating from the given UE device may be handled by CPN 302 regardless of the location of the user.

As shown in FIG. 3, CPN 302 may be configured to forward at least some of the control traffic to one or more network tools 306A for further analysis. Similarly, UPN1 304A and UPN2 304B may be configured to forward at least some of the user traffic to one or more other network tools 306B for further analysis. In other embodiments, UPN1 304A and UPN2 304B may each be coupled to a separate set of network tools. The visibility platform 300 and the network tools 306A-B may be operable as in-band (i.e., "inline") components or out-of-band components. Out-of-band components operate outside of the path of traffic between an origination node and a destination node, and thus receive copies of the packets that make up the traffic rather than the original packets. Out-of-band components are able to freely modify the copies of the packets because the original packets are allowed to traverse the data network unimpeded. Inline components, on the other hand, operate within the path of traffic between an origination node and a destination node, and thus receive the original packets.

In some embodiments, the network tools 306A-B are hosted locally as part of the visibility platform 300. For example, CPN 302 and its network tool(s) 306A may reside on the same computer server. In other embodiments, these network tools 306A-B are hosted remotely (e.g., within an on-premises computing environment controlled by an operator).

The network tool(s) through which packets should be routed may be determined based on a flow instruction, which in turn is based on a characteristic of the traffic, such as its protocol, origin, destination, etc. For example, a UPN may separate incoming user traffic into different types, such as IMS voice, video, Internet, etc., and then forward the batches of packets to different series of network tools for analysis. As another example, a UPN may separate incoming user traffic based on its origination and then forward the batches of packets to different series of network tools for analysis according to their origination.

Figure 3B:
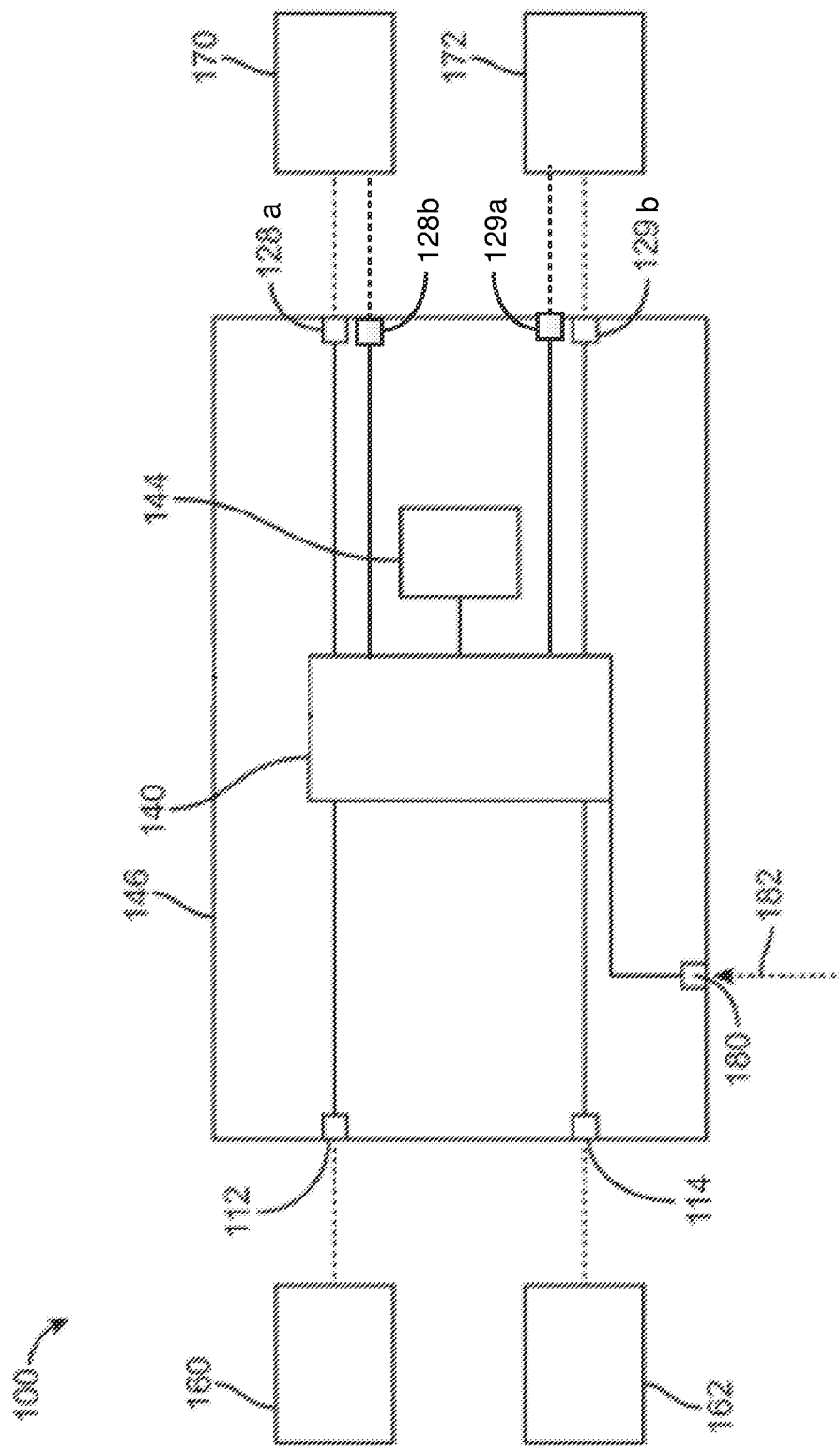
FIG. 3B is a block diagram showing an example of a network visibility node.

FIG. 3B is a block diagram showing an example of a network visibility node (also called "visibility node"), which can be a CPN or a UPN in an EPC/CUPS environment. The visibility node 100 includes a first network port 112, a second network port 114, a first pair of tool ports including an egress tool port 128a and an ingress tool port 128b, and a second pair of tool ports including an egress port 129a and an ingress port 129b. Packets received by the visibility node 100 are sent through tool egress port 128a to tool 170, which after processing those packets returns them to the visibility node 100 through tool ingress port 128b. Similarly, packets received by the visibility node 100 are sent through tool egress port 129a to tool 172, which after processing those packets returns them to the visibility node 100 through tool ingress port 129b. In other embodiments the visibility node 100 may contain more or fewer tool ports than four, and in operation, it may be coupled to more or fewer tools than two.

The visibility node 100 also includes a packet switch ("switch module") 140 that implements selective coupling between network ports 112, 114 and tool ports 128, 129. As used in this specification, the term "tool port" refers to any port that is configured to transmit packets to or receive packets from a tool. The visibility node 100 further includes a processor 144, and a network switch housing 146 for containing the packet switch 140 and the processor 144. The processor 144 may be, for example, a general-purpose programmable microprocessor (which may include multiple cores), an application specific integrated circuit (ASIC) processor, a field programmable gate array (FPGA), or other convenient type of circuitry.

The visibility node 100 may also include other components not shown, such as one or more network physical layers ("PHYs") coupled to each of the respective ports 112, 114, wherein the network PHYs may be parts of the packet switch 140. Alternatively, the network PHYs may be components that are separate from the integrated circuit 140. The PHY is configured to connect a link layer device to a physical medium such as an optical fiber, copper cable, etc. In other embodiments, instead of the PHY, the visibility node 100 may include an optical transceiver, or a Serializer/Deserializer (SerDes), etc.

The housing 146 allows the visibility node 100 to be carried, transported, sold, and/or operated as a single unit. The ports 112, 114, 128, 129 are located at a periphery of the housing 146 and may be at least partially contained within the housing 146. In other embodiments, the ports 112, 114, 128, 129 may be located at other locations relative to the housing 146. Although two network ports 112, 114 are shown, in other embodiments the visibility node 100 may include more than two network ports. Also, although two tool ports 128, 129 are shown, in other embodiments, the visibility node 100 may include only one tool port, or more than two tool ports.

During use, the first network port 112 of the visibility node 100 is communicatively coupled (e.g., via a network, such as the Internet) to a first node 160, and the second network port 114 is communicatively coupled (e.g., via a network, such as the Internet) to a second node 162. The visibility node 100 is configured to communicate packets between the first and second nodes 160, 162 via the network ports 112, 114. Also, during use, the tool ports 128, 129 of the visibility node 100 are communicatively coupled to respective tools 170, 172. The tools 170, 172 may include, for example, one or more of an IDS, IPS, packet sniffer, monitoring system, etc. The tools 170, 172 may be directly coupled to the visibility node 100, or communicatively coupled to the visibility node 100 through the network (e.g., the Internet). In some cases, the visibility node 100 is a single unit that can be deployed at a single point along a communication path.

In the illustrated embodiments, the packet switch 140 is configured to receive packets from nodes 160, 162 via the network ports 112, 114, and process the packets in accordance with a predefined scheme. For example, the packet switch 140 may pass packets received from one or more nodes to one or more tools 170, 172 that are connected to respective tool port(s) 128, 129, respectively.

The packet switch 140 may be any type of switch module that provides packet transmission in accordance with a predetermined transmission scheme (e.g., a policy). In some embodiments, the packet switch 140 may be user-configurable such that packets may be transmitted in a one-to-one configuration (i.e., from one network port to an tool port). The tool may be an out-of-band device (i.e., it can only receive packets intended to be communicated between two nodes, and cannot transmit such packets downstream), such as a sniffer, a network monitoring system, an application monitoring system, an IDS, a forensic storage system, an application security system, etc. Alternatively, the tool may be an in-line device (i.e., it can receive packets, and transmit the packets back to the visibility node 100 after the packets have been processed), such as an IPS. In other embodiments, the packet switch 140 may be configured such that the packets may be transmitted in a one-to-many configuration (i.e., from one network port to multiple tool ports). In other embodiments, the packet switch 140 may be configured such that the packets may be transmitted in a many-to-many configuration (i.e., from multiple network ports to multiple tool ports). In further embodiments, the packet switch 140 may be configured such that the packets may be transmitted in a many-to-one configuration (i.e., from multiple network ports to one tool port). In some embodiments, the one-to-one, one-to-many, many-to-many, and many-to-one configurations are all available for allowing a user to selectively configure the visibility node 100 so that received packets (or certain types of received packets) are routed according to any of these configurations. In some embodiments, the packet movement configuration is predetermined such that when the visibility node 100 receives the packets, the visibility node 100 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.).

Examples of visibility node 100 that may implement features and functions described herein include any of the GigaVUE® series of network visibility appliances available from Gigamon® Inc. of Santa Clara, Calif.

Packet Forwarding for Visibility

As noted above, the visibility node 100 can be an example of how to implement a CPN or UPN in an EPC/CUPS architecture. The flow instructions can be programmed by the CPN, e.g., CPN 302 in FIG. 3A. Accordingly, CPN 302 may need to communicate flow instructions to UPN1 304A and UPN2 304B so that incoming user traffic is forwarded to the appropriate network tool(s) for analysis. FIGS. 4A and 4B illustrate data structures (i.e., data objects, also called "maps") that can be used by a CPN and UPN to correctly route traffic to their respective tools. Specifically, FIG. 4A illustrates an example of a flow map 400 that can be implemented in a CPN or a UPN in a CUPS architecture. Note that while the data structures of FIGS. 4A, 4B and 5 are illustrated as tables, in various embodiments any other known or convenient type of data structure can be used to associate the types of data discussed herein. Further, in some embodiments these data structures may be combined, or they may be separated into a larger number of data structures.

Flow map 400 associates each of various types of network traffic with a particular port group identifier. For example, video traffic is mapped only to port group PG1 of the local visibility node (CPN or UPN), IMS voice traffic is mapped only to port group PG2 of the local visibility node, and Internet traffic is mapped only to port group PG3 of the local visibility node.

Flow map 400 can be used in conjunction with a port group map (also called "port map") 410, such as illustrated in FIG. 4B. Port map 410 associates the port group identifier for each port group defined for the local visibility node (CPN or UPN) with the specific tool ports of that visibility node that are included in that port group. For example, port group PG1 includes tool ports 1, 2, 3 and 4 of the local visibility node, port group PG2 includes tool ports 5 and 6 of the local visibility node, and port group PG3 includes tool ports 7 and 8 of the local visibility node.

FIG. 4C illustrates examples of flow maps and port maps that may be used by a CPN and a UPN, according to one possible approach to visibility in a CUPS environment. As can be seen, the CPN and the UPN each includes their flow map and port map. More specifically, the CPN includes flow map 400a and port map 410a, while the UPN includes flow map 400b and port map 410b. While these maps may be similar in structure as between the CPN and UPN, they may have completely different contents, since the number and configuration of tool ports on the UPN may be different from the number and configured of tool ports on the CPN. Consequently, after mirroring the flow map from the CPN to the UPN, there is often required some modification to the contents of these maps on the UPN, by a network administrator.

It can be seen, therefore, that the separation of the CPN and UPNs of the visibility platform 300 may make it more difficult to understand and/or to properly program the forwarding policies of the visibility platform 300. Accordingly, the technique introduced here simplifies this process. As mentioned above, the technique involves creating a new property, called "tool alias" herein, which is included in each port map on the CPN and each UPN. Each tool alias is used to associate a particular type of traffic with a tool port group. The CPN does correlation of data and applies the configured policies. When the CPN sends the flow forwarding information to the UPN(s), it includes the tool alias for the applicable traffic type. On the UPN, there is no longer need to mirror the flow map from the CPN. All that is needed in the UPN is a local port map that includes the tool alias for each port group. When the UPN receives the tool alias from the CPN, it simply looks up that tool alias in the port map to determine the appropriate tool ports to send the traffic to. Hence, with this approach the UPN only needs to know the tool alias mapping; all of the forwarding policy decisions are made by the CPN FIG. 5A illustrates an example of a port map in accordance with technique introduced here. As shown, port map 500 is similar to port map 410 in FIG. 4B, except it includes an additional property (column), called "Tool Alias." In accordance with the technique introduced here, the CPN and each corresponding UPN will have a port map such as port map 500 in FIG. 5; although the values listed for Port Group and/or the corresponding individual port identifiers may be different on each of these nodes. The Tool Alias property, however, functionally binds all of the visibility nodes in the visibility platform together to provide consistent forwarding for any given type of network traffic. In at least some embodiments, each unique value of Tool Alias corresponds to a particular type of network traffic, such as video, IMS voice or Internet. Port map 500 therefore associates each Tool Alias value with a particular Port Group of the visibility node (CPN or UPN) that uses port map 500. In the example of FIG. 5, port group PG1 is associated with video traffic, as indicated by its associated Tool Alias having the (string) value "video." Similarly, port group PG2 is associated with IMS voice traffic, as indicated by its associated Tool Alias having the value "ims_voice"; and port group PG3 is associated with Internet traffic, as indicated by its associated Tool Alias having the value of "internet." Note that the value assigned to any particular instance of Tool Alias does not have to expressly name or describe the associated traffic type, although that was done in this example to facilitate explanation. What matters is that the same value of Tool Alias is used by both the CPN and all of its associated UPNs for any particular traffic type.

Accordingly, the Tool Alias property (and port map 500) can be used to directly associate a particular type of network traffic with a particular port group of the local visibility node. Consequently, each UPN only needs to receive the tool alias value from its CPN for a given type of network traffic in a given session, in order to determine the correct forwarding route. There is no need to mirror the forwarding map from the CPN to the UPN.

In one possible scenario, the CPN and one or more corresponding UPNs run on the same physical device. These nodes could have common port groups or different port groups. In either case a port group can be bound by the Tool Alias property. In a second scenario, the CPN and one or more corresponding UPNs run on different physical devices in a cluster. As in the previous scenario, these nodes could have common port groups or different port groups, where the port group can be bound by the Tool Alias property. In a third scenario, the CPN runs in a separate cluster from the one or more corresponding UPNs, in which case different port groups would be needed on each of the physical devices.

Figure 5B:
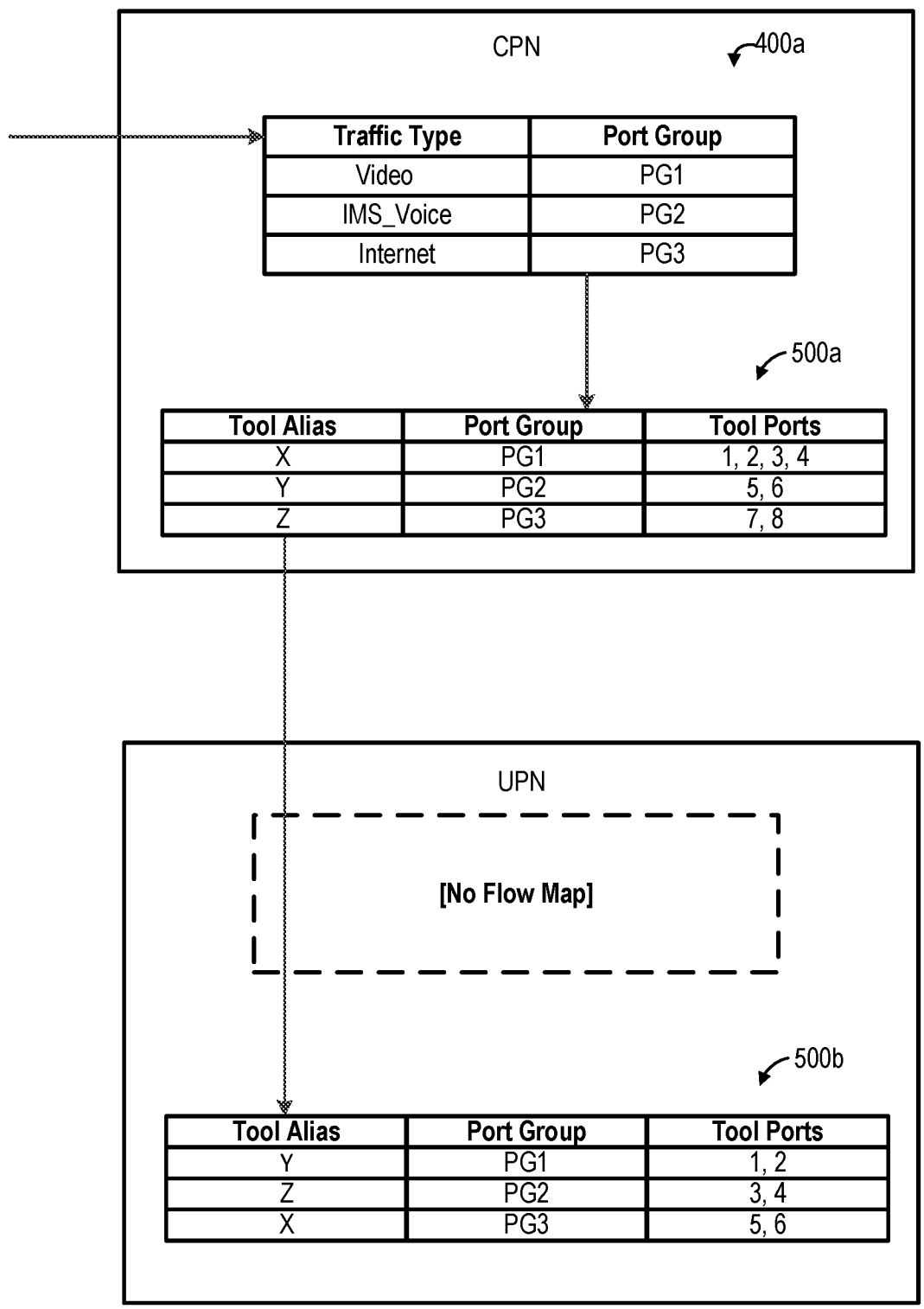
FIG. 5B illustrates examples of flow maps and port maps that may be used by a CPN and a UPN in accordance with the technique represented in FIG. 5A.

FIG. 5B illustrates examples of flow maps and port maps that may be used by a CPN and a UPN in accordance with the technique represented in FIG. 5A. The CPN includes flow map 400a and port map 500a, where port map 500a includes the added Tool Alias property for each of its local tool port groups. In this scenario, the UPN does not require a flow map like flow map 400a used in the CPN, because the UPN has its own port map 500b that includes the Tool Alias property for each of its local tool port groups. Note that the UPN has a different number and configuration of tool ports than the CPN in the example of FIG. 5B, and assigns the different types of traffic to different port groups than CPN. Nonetheless, the value of Tool Alias is the same on the CPN and the UPN for any given type of traffic, which allows consistent and correct forwarding of each type of traffic to the tools of both the CPN and UPN.

Figure 6:
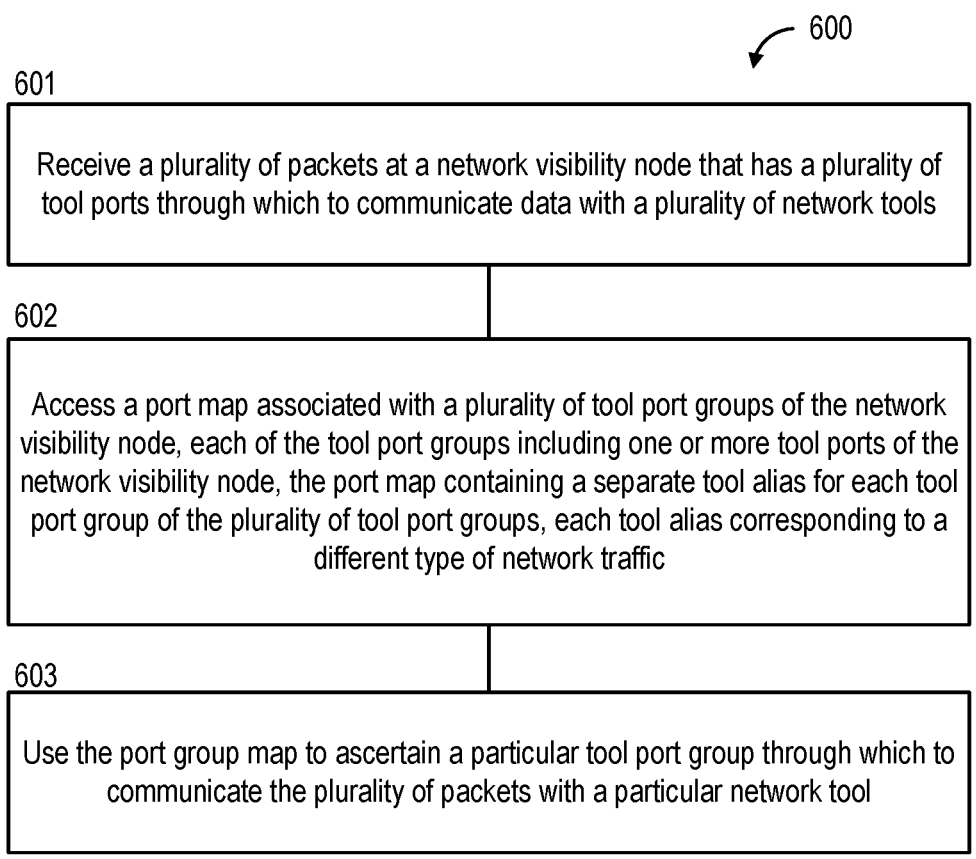
FIG. 6 is a flow diagram illustrating an example of a process for communicating received network packets with a network tool.

FIG. 6 is a flow diagram illustrating an example of a process by which a network visibility node (e.g., CPN or UPN) can communicate received network packets with a network tool. At step 601 the visibility node receives a plurality of packets. At step 602 the network visibility node accesses a port map associated with a plurality of tool port groups of the network visibility node. Each of the tool port groups includes one or more tool ports of the network visibility node, and the port map contains a separate tool alias for each tool port group. Each tool alias corresponds to a different type of network traffic. At step 603 the network visibility node uses the port map to ascertain a particular tool port group through which to communicate the plurality of packets with a particular network tool.

Figure 7:
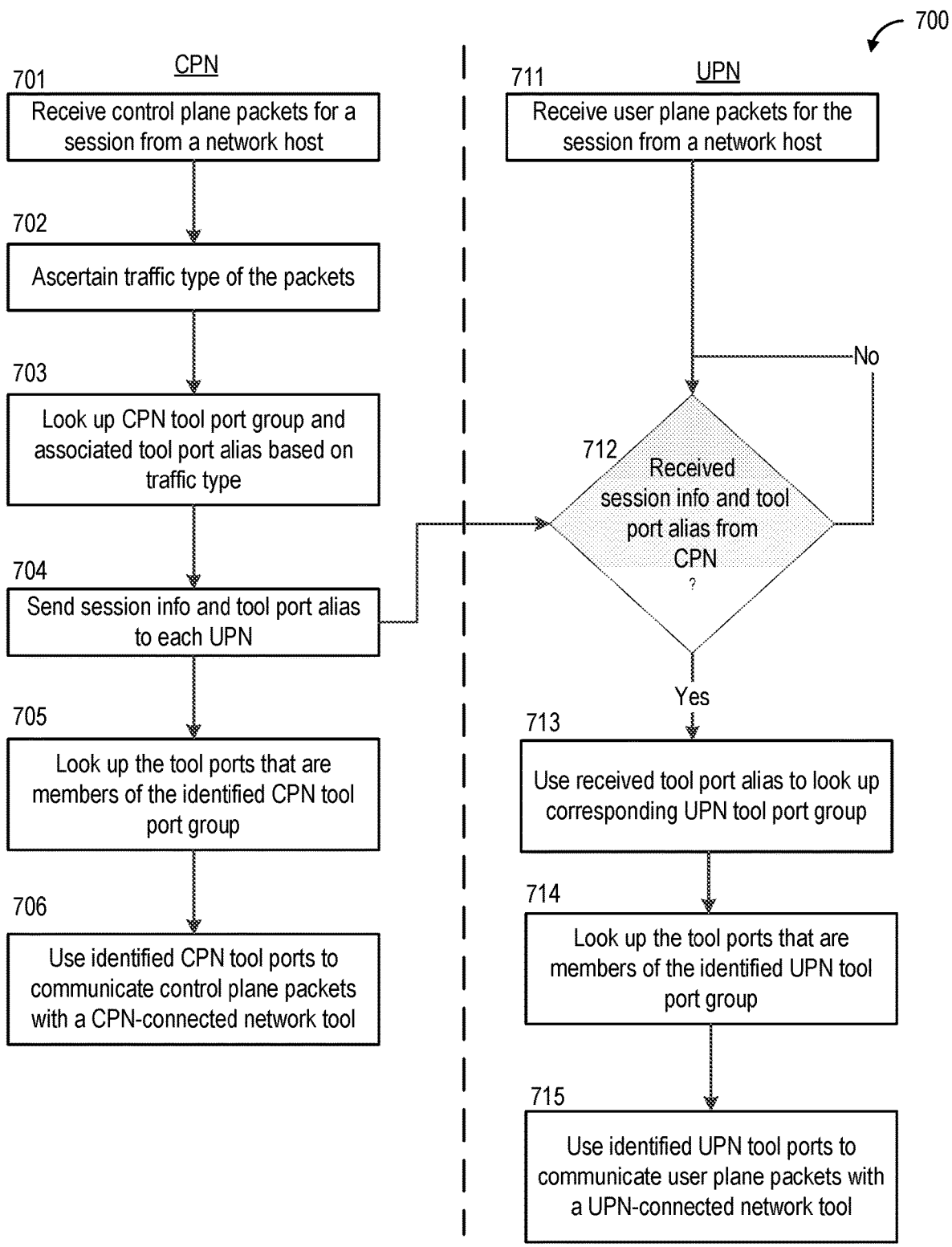
FIG. 7 is a flow diagram illustrating an example of a more detailed process by which a CPN and a UPN can route network packets to their respective tools.

FIG. 7 is a flow diagram showing a more detailed example of a process by which a CPN and a UPN can route network packets to their respective tools. At step 701 the CPN receives control plane packets for a particular session from a network host (e.g., a control plane gateway). Similarly, at step 711, the UPN receives user plane packets for the same session, from a network host (e.g., a user plane gateway). Steps 701 and 711 may occur concurrently, though not necessarily. Next, the UPN waits at step 712, if it has not already received a tool alias and session information from the CPN, until it receives that information from the CPN.

At step 702, the CPN ascertains the traffic type for the received packets (e.g., video, IMS voice, Internet). The traffic type may be determined, for example, from headers of the received packets. At step 703, the CPN uses its local flow map (see example in FIG. 4A) to look up its local tool port group that is associated with that particular type of network traffic. The CPN then uses its port map (see example in FIG. 5) to look up the tool alias associated with that particular tool port group. At step 704, the CPN sends the tool alias that it looked up and session information for the current session to each UPN that it services. Processing flow then proceeds to both step 705 on the CPN and step 712 on the UPN.

At step 705, the CPN looks up the specific tool ports that are members of the identified CPN tool port group (as identified in step 703). At step 706, the CPN uses the identified CPN tool ports to communicate the control plane packets with one or more of its connected network tools.

Referring now to the UPN, when the UPN receives the session information and tool alias from the CPN (step 712), then at step 713 the UPN uses the received tool alias to look up its local tool port group associated with that tool alias in its port map (see example in FIG. 5). At step 714 the UPN looks up the tool ports that are members of that identified tool port group. At step 715, the UPN uses the identified UPN tool ports to communicate the user plane packets with one or more of its connected network tools.

Processing System Architecture

Figure 8:
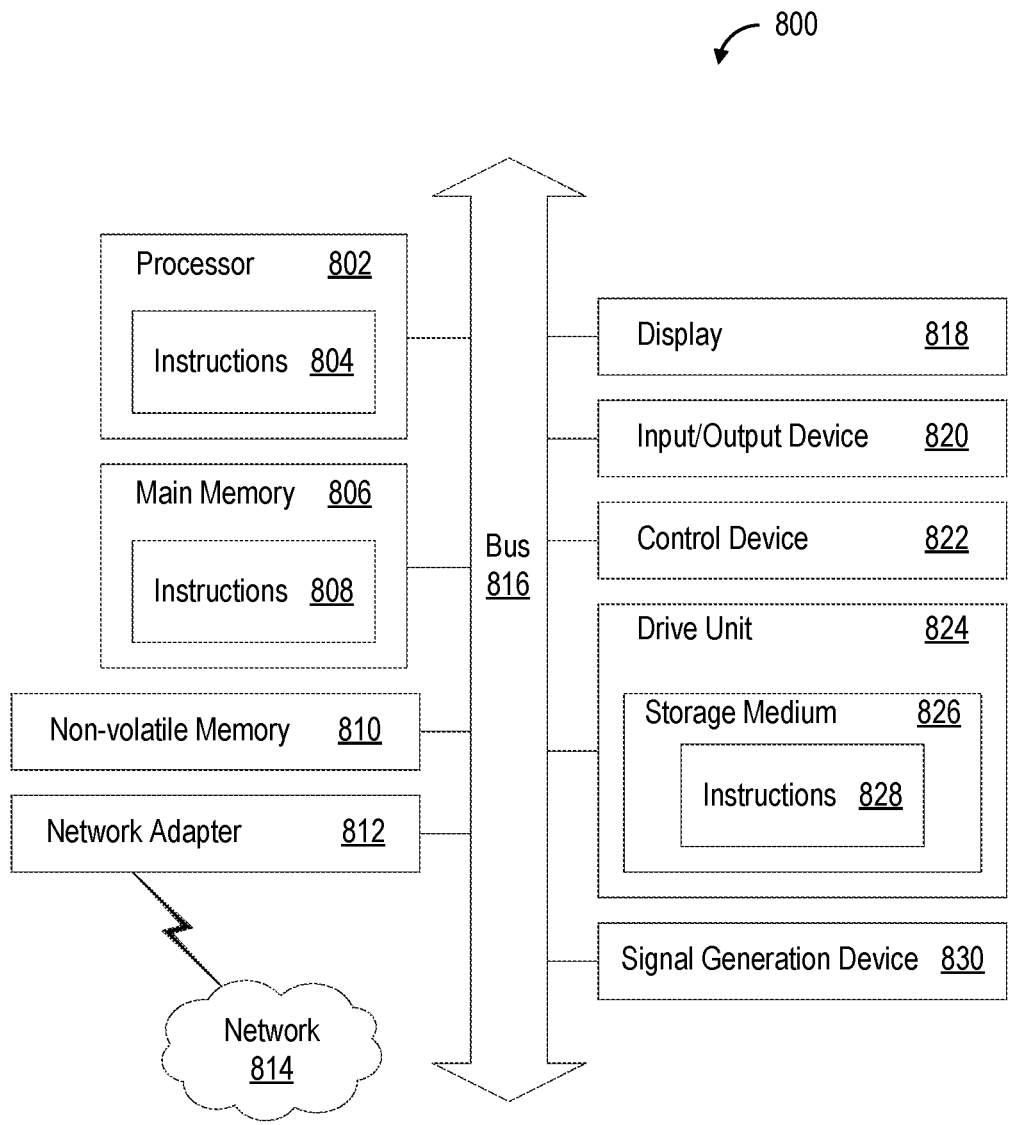
FIG. 8 includes a block diagram illustrating an example of a processing system in which at least some operations described herein can be implemented.

FIG. 8 includes a block diagram illustrating an example of a processing system 800 in which at least some operations described herein can be implemented. For example, processing system 800 may be an example implementation of a visibility node that may implement the technique introduced above. At least a portion of the processing system 800 may be included in an electronic device (e.g., a computer server) that supports one or more CPNs and/or one or more UPNs. The processing system 800 may include one or more processors 802, main memory 806, non-volatile memory 810, network adapter 812 (e.g., network interfaces), display 818, input/output devices 820, control device 822 (e.g., keyboard and pointing devices), drive unit 824 including a storage medium 826, and signal generation device 830 that are communicatively connected to a bus 816. The bus 816 represents any one or more separate physical buses, point to point connections, or any combination thereof, connected by appropriate bridges, adapters, or controllers. The bus 816, therefore, can include, for example, a system bus, a Peripheral Component Interconnect (PCI) bus or PCI-Express bus, a HyperTransport or industry standard architecture (ISA) bus, a small computer system interface (SCSI) bus, any version of a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of a network appliance, such as a switching engine, network port(s), tool port(s), etc.

In various embodiments, the processing system 800 operates as a standalone device, although the processing system 800 may be connected (e.g., wired or wirelessly) to other devices. For example, the processing system 800 may include a terminal that is coupled directly to a network appliance. As another example, the processing system 800 may be wirelessly coupled to the network appliance.

In various embodiments, the processing system 800 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the processing system 800.

While the main memory 806, non-volatile memory 810, and storage medium 826 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 828. The term "machine-readable medium" and "storage medium" shall also be taken to include any medium that is capable of storing, encoding, or carrying a set of instructions for execution by the processing system 800 and that cause the processing system 800 to perform any one or more of the methodologies of the presently disclosed embodiments.

In general, the routines that are executed to implement the technology disclosed above may be implemented as part of an operating system or an application, component, program, object, module, or sequence of instructions (collectively referred to as "computer programs"). The computer programs typically comprise one or more instructions (e.g., instructions 804, 808, 828) set at various times in various memory and storage devices in a computer, and that, when read and executed by one or more processing units or processors 802, cause the processing system 800 to perform operations to execute elements involving the various aspects of the above disclosure.

Moreover, while embodiments have been described in the context of fully functioning computers, computer systems and/or other devices, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 810, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 812 enables the processing system 800 to mediate data in a network 814 with an entity that is external to the processing system 800, such as a network appliance, through any known and/or convenient communications protocol supported by the processing system 800 and the external entity. The network adapter 812 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination of such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Examples of Certain Embodiments

Certain embodiments of the technology introduced herein are summarized in the following numbered examples:

1. A method comprising: receiving a plurality of packets at a first network node that has a plurality of tool ports through which to communicate data with a plurality of network tools; accessing, by the first network node, a port group map associated with a plurality of tool port groups of the first network node, each of the tool port groups including one or more tool ports of the first network node, the port group map containing a separate tool alias for each tool port group of the plurality of tool port groups, each said tool alias corresponding to a different type of network traffic; and using the port group map to ascertain a tool port group through which to communicate the plurality of packets with a particular network tool.

2. A method as recited in example 1, wherein the first network node is a control processing node (CPN) in a control and user plane separation (CUPS) network architecture.

3. A method as recited in example 1 or example 2, further comprising: determining, by the first network node, that the plurality of packets belong to a particular type of network traffic; ascertaining, by the first network node, a first tool alias corresponding to the particular type of network traffic; and sending, by the first network node, the first tool alias to a second network node in the CUPS architecture, for use by the second network node in ascertaining a second tool port group associated with the second network node, through which to communicate packets of, or relating to, the plurality of packets, wherein the second network node is a user processing node (UPN) in the CUPS network architecture.

4. A method as recited in any of examples 1 through 3, wherein said ascertaining comprises: determining a particular tool port group, of the plurality of tool port groups, corresponding to the particular type of network traffic, based on a flow map that indicates a corresponding tool port group for each of a plurality of types of network traffic; and determining the first tool alias from a tool port map containing an association of the particular tool port group with the first tool alias.

5. A method as recited in any of examples 1 through 4, wherein the plurality of types of network traffic include at least two from the list consisting of: video, IMS voice and Internet.

6. A method as recited in any of examples 1 through 5, wherein the first network node is a user processing node (UPN) in a control and user plane separation (CUPS) network architecture.

7. A method as recited in any of examples 1 through 6, further comprising: receiving, by the first network node, the tool alias from a second network node, wherein the second network node is a control processing node (CPN) in the CUPS network architecture; ascertaining, by the first network node, a particular tool port group of the plurality of tool port groups, based on the first tool alias, and forwarding, by the first network node, at least some packets of the plurality of packets to a particular network tool of the plurality of network tools, via the particular port group.

8. A method as recited in any of examples 1 through 7, wherein the first network node does not have access to a direct mapping of network traffic types to tool port groups.

9. A network visibility node comprising: a plurality of network ports through which to communicate data with a plurality of network hosts, the data including a plurality of packets; a plurality of tool ports through which to communicate with a plurality of network tools coupled to the network visibility node, the plurality of tool ports being grouped into a plurality of tool port groups, each of the tool port groups including at least two tool ports; a storage device storing a first port group map that specifies, for each tool port group of the plurality of tool port groups, a list of corresponding tool ports belonging to the tool port group and a tool alias corresponding to a traffic type associated with the tool port group; and processor circuitry configured to use the port group map to determine a particular set of tool ports to use, of the plurality of tool ports, for communication with a particular network tool of the plurality of network tools.

10. A network visibility node as recited in example 9, wherein the traffic type is one of a plurality of traffic types that the network visibility node is capable of processing.

11. A network visibility node as recited in example 9 or example 10, wherein the network visibility node is configured as a control processing node (CPN) in a control and user plane separation (CUPS) network architecture.

12. A network visibility node as recited in any of examples 9 through 11, wherein the processor circuitry is further configured to: determine that the plurality of packets belong to a particular type of network traffic; ascertain a particular tool alias corresponding to the particular type of network traffic, based on a flow map that that indicates a corresponding tool port group for each of a plurality of types of network traffic; and send the particular tool alias to a second network visibility node operating as a user processing node (UPN) in the CUPS network architecture, the particular tool alias for use by the second network visibility node to ascertain a second tool port group associated with the second network visibility node, through which to communicate packets of or relating to the plurality of packets.

13. A network visibility node as recited in any of examples 9 through 12, wherein the plurality of types of network traffic include at least two from the list consisting of: video, IMS voice and Internet.

14. A network visibility node as recited in any of examples 9 through 13, wherein the network visibility node is configured as a user processing node (UPN) in a control and user plane separation (CUPS) network architecture.

15. A network visibility node as recited in any of examples 9 through 14, wherein the processor circuitry is further configured to: receive a particular tool alias from a second network visibility node operating as a control processing node (CPN) in the CUPS network architecture; ascertain a particular tool port group of the plurality of tool port groups, based on the first tool alias, and communicate at least some packets of the plurality of packets with a particular network tool of the plurality of network tools, via the particular port group.

16. A network visibility node as recited in any of examples 9 through 15, wherein the network visibility node does not have access to a direct mapping of network traffic types to tool port groups.

17. A system for use in a control and user plane separation (CUPS) network architecture, the system comprising: a control processing node (CPN) including a first plurality of network ports through which to communicate data with a plurality of network hosts and including a first plurality of tool ports through which to communicate with a first plurality of network tools coupled to the CPN; the CPN having access to a flow map that indicates, for each of a plurality of types of network traffic, a corresponding tool port group representing a subset of the first plurality of tool ports of the CPN, the flow map containing information regarding a plurality of tool port groups of the CPN, and the CPN further having access to a first port group map specifying, for each port group of the plurality of port groups of the CPN, a list of corresponding tool ports of the CPN and a tool alias corresponding to a traffic type associated with the port group; the CPN including first processor circuitry configured to: receive a first subset of a plurality of packets via a network port of the first plurality of network ports, ascertain a traffic type associated with the plurality of packets, ascertain a first tool port group of the first plurality of tool port groups, through which to communicate at least some of the plurality of packets with a first network tool of the first plurality of network tools, based on the traffic type and the first port group map, communicate at least some packets of the first subset of the plurality of packets, with a first network tool of the first plurality of network tools coupled to the CPN, via the first tool port group, ascertain a first tool alias associated with the traffic type based on the flow map and the first port group map, and send the first tool alias to another network node; and a user processing node (UPN) including a second plurality of network ports, and including a second plurality of tool ports through which to communicate with a second plurality of network tools coupled to the UPN, the second plurality of tool ports including a second plurality of tool port groups; the UPN having access to a second port group map specifying, for each tool port group of the second plurality of tool port groups, a list of corresponding tool ports of the UPN and a tool alias corresponding to a traffic type associated with the tool port group; the UPN including second processor circuitry configured to: receive a second subset of the plurality of packets via a network port of the second plurality of network ports, receive the first tool alias from the CPN in a message associated with the plurality of packets, ascertain a particular tool port group of the second plurality of tool port groups, based on the first tool alias, and communicate at least some packets of the second subset of the plurality of packets with a particular network tool of the second plurality of network tools, via the particular tool port group; wherein the UPN does not have access to a direct mapping of network traffic types to tool port groups of the second plurality of tool port groups.

18. A system as recited in any of examples 9 through 16, wherein the plurality of types of network traffic include at least two from the list consisting of: video, IMS voice and Internet.

19. An apparatus comprising: means for receiving a plurality of packets at a first network node that has a plurality of tool ports through which to communicate data with a plurality of network tools; means for accessing, by the first network node, a port group map associated with a plurality of tool port groups of the first network node, each of the tool port groups including one or more tool ports of the first network node, the port group map containing a separate tool alias for each tool port group of the plurality of tool port groups, each said tool alias corresponding to a different type of network traffic; and means for using the port group map to ascertain a tool port group through which to communicate the plurality of packets with a particular network tool.

20. An apparatus as recited in example 19, wherein the first network node is a control processing node (CPN) in a control and user plane separation (CUPS) network architecture.

21. An apparatus as recited in example 19 or example 20, further comprising: means for determining, by the first network node, that the plurality of packets belong to a particular type of network traffic; means for ascertaining, by the first network node, a first tool alias corresponding to the particular type of network traffic; and means for sending, by the first network node, the first tool alias to a second network node in the CUPS architecture, for use by the second network node in ascertaining a second tool port group associated with the second network node, through which to communicate packets of, or relating to, the plurality of packets, wherein the second network node is a user processing node (UPN) in the CUPS network architecture.

22. An apparatus as recited in any of examples 19 through 22, wherein said means for ascertaining comprises: means for determining a particular tool port group, of the plurality of tool port groups, corresponding to the particular type of network traffic, based on a flow map that indicates a corresponding tool port group for each of a plurality of types of network traffic; and means for determining the first tool alias from a tool port map containing an association of the particular tool port group with the first tool alias.

23. An apparatus as recited in any of examples 19 through 22, wherein the plurality of types of network traffic include at least two from the list consisting of: video, IMS voice and Internet.

24. An apparatus as recited in any of examples 19 through 23, wherein the first network node is a user processing node (UPN) in a control and user plane separation (CUPS) network architecture.

25. An apparatus as recited in any of examples 9 through 24, further comprising: means for receiving, by the first network node, the tool alias from a second network node, wherein the second network node is a control processing node (CPN) in the CUPS network architecture; means for ascertaining, by the first network node, a particular tool port group of the plurality of tool port groups, based on the first tool alias, and means for forwarding, by the first network node, at least some packets of the plurality of packets to a particular network tool of the plurality of network tools, via the particular port group.

26. An apparatus as recited in any of examples 19 through 25, wherein the first network node does not have access to a direct mapping of network traffic types to tool port groups.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    receiving a plurality of packets at a first network node that has a plurality of tool ports through which to communicate data with a plurality of network tools;
    accessing, by the first network node, a port group map associated with a plurality of tool port groups of the first network node, each of the tool port groups including one or more tool ports of the first network node, the port group map containing a separate tool alias for each tool port group of the plurality of tool port groups, each said tool alias corresponding to a different type of network traffic; and
    using the port group map to ascertain a tool port group through which to communicate the plurality of packets with a particular network tool.

2. A method as recited in claim 1, wherein the first network node is a control processing node (CPN) in a control and user plane separation (CUPS) network architecture.

3. A method as recited in claim 2, further comprising:
    determining, by the first network node, that the plurality of packets belong to a particular type of network traffic;
    ascertaining, by the first network node, a first tool alias corresponding to the particular type of network traffic; and
    sending, by the first network node, the first tool alias to a second network node in the CUPS architecture, for use by the second network node in ascertaining a second tool port group associated with the second network node, through which to communicate packets of, or relating to, the plurality of packets, wherein the second network node is a user processing node (UPN) in the CUPS network architecture.

4. A method as recited in claim 3, wherein said ascertaining comprises:
    determining a particular tool port group, of the plurality of tool port groups, corresponding to the particular type of network traffic, based on a flow map that indicates a corresponding tool port group for each of a plurality of types of network traffic; and
    determining the first tool alias from a tool port map containing an association of the particular tool port group with the first tool alias.

5. A method as recited in claim 4, wherein the plurality of types of network traffic include at least two from the list consisting of: video, IMS voice and Internet.

6. A method as recited in claim 1, wherein the first network node is a user processing node (UPN) in a control and user plane separation (CUPS) network architecture.

7. A method as recited in claim 6, further comprising:
    receiving, by the first network node, the tool alias from a second network node, wherein the second network node is a control processing node (CPN) in the CUPS network architecture;
    ascertaining, by the first network node, a particular tool port group of the plurality of tool port groups, based on the first tool alias, and forwarding, by the first network node, at least some packets of the plurality of packets to a particular network tool of the plurality of network tools, via the particular port group.

8. A method as recited in claim 6, wherein the first network node does not have access to a direct mapping of network traffic types to tool port groups.

9. A network visibility node comprising:
a plurality of network ports through which to communicate data with a plurality of network hosts, the data including a plurality of packets;
a plurality of tool ports through which to communicate with a plurality of network tools coupled to the network visibility node, the plurality of tool ports being grouped into a plurality of tool port groups, each of the tool port groups including at least two tool ports;
a storage device storing a first port group map that specifies, for each tool port group of the plurality of tool port groups, a list of corresponding tool ports belonging to the tool port group and a tool alias corresponding to a traffic type associated with the tool port group; and
processor circuitry configured to use the port group map to determine a particular set of tool ports to use, of the plurality of tool ports, for communication with a particular network tool of the plurality of network tools.

10. A network visibility node as recited in claim 9, wherein the traffic type is one of a plurality of traffic types that the network visibility node is capable of processing.

11. A network visibility node as recited in claim 9, wherein the network visibility node is configured as a control processing node (CPN) in a control and user plane separation (CUPS) network architecture.

12. A network visibility node as recited in claim 11, wherein the processor circuitry is further configured to:
determine that the plurality of packets belong to a particular type of network traffic;
ascertain a particular tool alias corresponding to the particular type of network traffic, based on a flow map that that indicates a corresponding tool port group for each of a plurality of types of network traffic; and
send the particular tool alias to a second network visibility node operating as a user processing node (UPN) in the CUPS network architecture, the particular tool alias for use by the second network visibility node to ascertain a second tool port group associated with the second network visibility node, through which to communicate packets of or relating to the plurality of packets.

13. A network visibility node as recited in claim 12, wherein the plurality of types of network traffic include at least two from the list consisting of: video, IMS voice and Internet.

14. A network visibility node as recited in claim 9, wherein the network visibility node is configured as a user processing node (UPN) in a control and user plane separation (CUPS) network architecture.

15. A network visibility node as recited in claim 14, wherein the processor circuitry is further configured to:
receive a particular tool alias from a second network visibility node operating as a control processing node (CPN) in the CUPS network architecture;
ascertain a particular tool port group of the plurality of tool port groups, based on the first tool alias, and
communicate at least some packets of the plurality of packets with a particular network tool of the plurality of network tools, via the particular port group.

16. A network visibility node as recited in claim 15, wherein the network visibility node does not have access to a direct mapping of network traffic types to tool port groups.

17. A system for use in a control and user plane separation (CUPS) network architecture, the system comprising:
a control processing node (CPN) including a first plurality of network ports through which to communicate data with a plurality of network hosts and including a first plurality of tool ports through which to communicate with a first plurality of network tools coupled to the CPN;
the CPN having access to a flow map that indicates, for each of a plurality of types of network traffic, a corresponding tool port group representing a subset of the first plurality of tool ports of the CPN, the flow map containing information regarding a plurality of tool port groups of the CPN, and
the CPN further having access to a first port group map specifying, for each port group of the plurality of port groups of the CPN, a list of corresponding tool ports of the CPN and a tool alias corresponding to a traffic type associated with the port group;
the CPN including first processor circuitry configured to
receive a first subset of a plurality of packets via a network port of the first plurality of network ports,
ascertain a traffic type associated with the plurality of packets,
ascertain a first tool port group of the first plurality of tool port groups, through which to communicate at least some of the plurality of packets with a first network tool of the first plurality of network tools, based on the traffic type and the first port group map,
communicate at least some packets of the first subset of the plurality of packets, with a first network tool of the first plurality of network tools coupled to the CPN, via the first tool port group,
ascertain a first tool alias associated with the traffic type based on the flow map and the first port group map, and
send the first tool alias to another network node; and
a user processing node (UPN) including a second plurality of network ports, and including a second plurality of tool ports through which to communicate with a second plurality of network tools coupled to the UPN, the second plurality of tool ports including a second plurality of tool port groups;
the UPN having access to a second port group map specifying, for each tool port group of the second plurality of tool port groups, a list of corresponding tool ports of the UPN and a tool alias corresponding to a traffic type associated with the tool port group;
the UPN including second processor circuitry configured to
receive a second subset of the plurality of packets via a network port of the second plurality of network ports,
receive the first tool alias from the CPN in a message associated with the plurality of packets,
ascertain a particular tool port group of the second plurality of tool port groups, based on the first tool alias, and
communicate at least some packets of the second subset of the plurality of packets with a particular network tool of the second plurality of network tools, via the particular tool port group;
wherein the UPN does not have access to a direct mapping of network traffic types to tool port groups of the second plurality of tool port groups.

18. A system as recited in claim 16, wherein the plurality of types of network traffic include at least two from the list consisting of: video, IMS voice and Internet.

* * * * *